April 23, 1929.  H. S. COE  1,709,971
LIQUID SEPARATOR
Filed May 20, 1925  2 Sheets-Sheet 1

Fig.1.

INVENTOR
HARRISON S. COE
BY Geo. F. Hyde
ATTORNEY

April 23, 1929.  H. S. COE  1,709,971
LIQUID SEPARATOR
Filed May 20, 1925   2 Sheets-Sheet 2
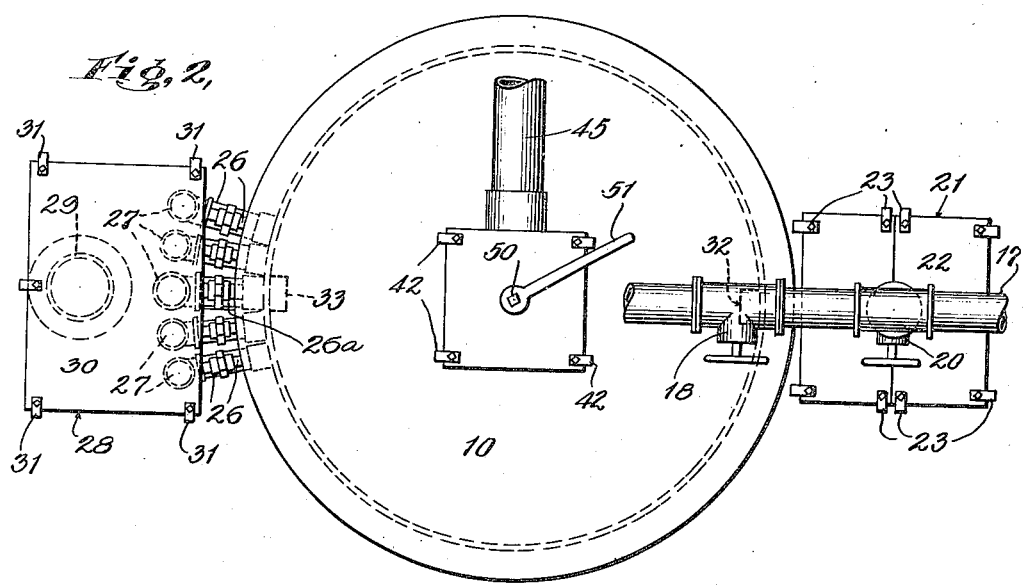
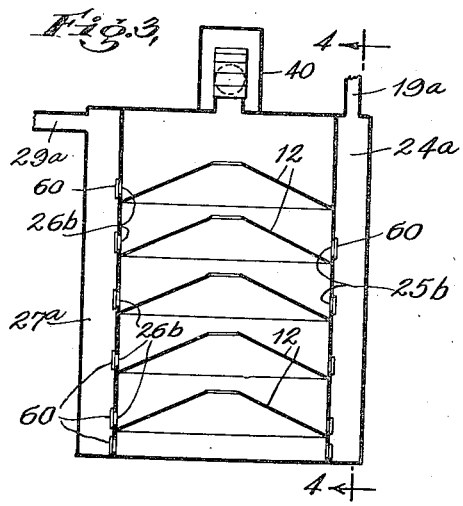
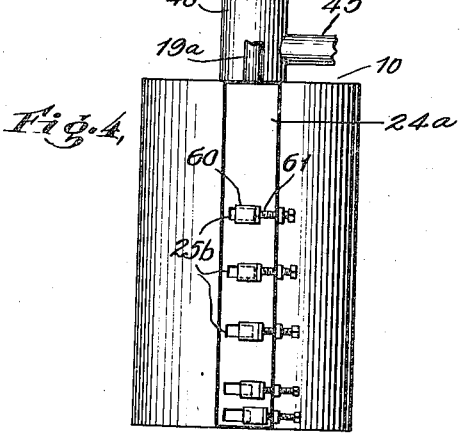
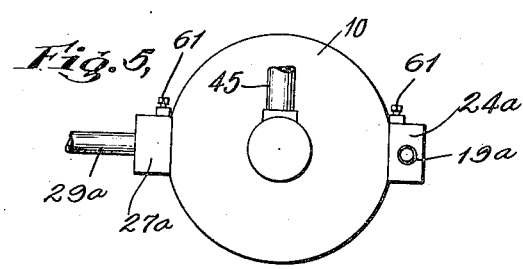
INVENTOR
HARRISON S. COE
BY Geo. G. Hyde
ATTORNEY Patented Apr. 23, 1929.

1,709,971

UNITED STATES PATENT OFFICE.

HARRISON S. COE, OF LA CYGNE, KANSAS, ASSIGNOR TO THE DORR COMPANY, OF NEW YORK, N. Y., A CORPORATION OF DELAWARE.

LIQUID SEPARATOR.

Application filed May 20, 1925. Serial No. 31,680.

This invention relates to the separation of liquids varying in specific gravity, and is especially directed to apparatus in which the lighter liquid rises and is drawn off. The invention is particularly adapted for the separation of oil from mixtures of oil and water such as are found in oil burning vessels, in which each oil fuel tank when emptied of oil is filled with salt water to maintain proper trim and ballast; and upon arriving at port the water, carrying a substantial amount of oil, is pumped out. The oil mixed with the water not only is lost, but also constitutes such a substantial element of harbor and coast pollution that the practice is generally regulated by strict laws.

Attempts have been made to solve the problem of removing the oil from the water; but owing to the fact that relatively large quantities of the mixture must be treated, preferably on board the ship itself, and the water must be substantially free from oil, no apparatus has been generally successful and accepted. Furthermore, extreme simplicity and certainty of operation are highly desirable, and preferably the device should require no power for operation.

These requirements have been met by the present invention, in general, by employing a separator tank having a vertically arranged series of compartments, each serving in a sense as an individual separation chamber, but having a compact common feed and discharge system. Furthermore, the individual compartments are inclined, the heavier liquid, such as water, traveling generally along the lower part of the compartment while the oil rises and flows along the sloping top to an outlet. These outlets are vertically aligned so that they form a vertical discharge passage for the lighter liquid, such as oil; and suitable arrangements are made for withdrawing the oil from the top of the tank.

The inlet and the respective outlets to each compartment are furthermore arranged so that the lighter and heavier liquids in their divergent flows to their respective points of discharge offer a minimum of opposition to each other, an arrangement which is particularly valuable where the lighter liquid is very close in specific gravity to the heavier liquid, as is the case where oil emulsions are mixed with the water. The size of the compartment and the length of the path therein from inlet to outlet are designed so that a relatively slow rate of flow may be obtained and ample time provided for the rising and separation of the lighter liquid, even where the difference in gravity is very slight. Moreover, these features have been combined in a relatively small and compact apparatus in which maximum use is made of the space provided.

While the inclined separation compartments may be of various forms, the type illustrated embodies a convenient feature, the compartments being substantially annular, as by the use of horizontal frusto-conical partitions, with feed inlets at one side of the tank, water outlets at the other side, and oil outlets at the apices of the partitions. This arrangement tends to insure that a minimum amount of water will be carried up with the oil, since the upper zone of such compartments is substantially restricted, though the top and bottom surfaces are parallel. This arrangement is particularly suitable for conditions where there is an excess of the heavier liquid, as in the particular problem mentioned of separating oil and water.

Numerous improved features have been furthermore embodied in the apparatus, including an oil chamber in which any residual water is removed; control of relative feed and discharge to the different compartments; and means for scraping or cleaning the surfaces of the partitions and any other parts necessary, without emptying or opening the machine. Other objects and advantages will be apparent from the following description taken in connection with the accompanying drawings in which Fig. 1 is a vertical section through a preferred form of the invention;

Fig. 2 is a top plan view of same;

Fig. 3 is a diagrammatic vertical section similar to Fig. 1 showing a simplified form;

Fig. 4 is a vertical section on line 4—4 of Fig. 3 and

Fig. 5 is a top plan view of the form shown in Fig. 3.

The separator comprises a tank 10 which may be divided into sections $10^a$, $10^b$, and $10^c$ connected by flanges 11, for convenience in introducing the tank into or thru narrow spaces such as are generally encountered on shipboard. A plurality of transverse partitions or trays 12 are mounted in a tank and extend to the side walls, dividing the tank into a plurality of compartments 13 between the partitions, together with a top compartment 14 and a bottom compartment 15. The latter acts in general in the same manner as the compartments 13 in the operation of the machine.

The partitions 12 are arranged at a suitable slope so that the lighter liquids separating from the feed below each partition wall tend to run up the lower face of the partition through the outlet. In the form shown the partitions are frusto-conical, with central aligned discharge openings 16 for the lighter liquid.

The feed, comprising a mixture of liquids varying in specific gravity, is introduced at one side of each compartment. In the form shown a feed line 17 with valve 18 has a downward branch 19 with valve 20, discharging into feed box 21 with split cover 22 removably held in place by hinge bolts 23. Feed box 21 discharges into feed conduit or well 24 which is connected with the compartments as by branch inlet pipes 25.

The outlet for the heavier liquid is provided in the lower part of each compartment at a point substantially distant from the inlet. For convenience the outlets may be arranged generally on the opposite side of the tank from the inlets, and in the form shown comprise a plurality of outlet pipes 26 connected to suitable risers 27 discharging into outlet box 28, the lower part of which is connected to the discharge pipe 29 through which the heavier liquids leave the system. This box may be closed by removable cover 30 held in place by hinge bolts 31.

It will be noted that in the arrangement shown a discharge outlet for the heavier liquid is provided for each compartment while feed is introduced to each compartment except the uppermost. Furthermore, compartment 13$^a$ is not directly connected with feed well 24 or an outlet 26, the feed to the compartment rising from inlet pipe 25$^a$ through a suitable opening 32 at the edge of the bottom partitions of said compartment, and the heavier liquid passes downwardly from a similar aperture 33 in the same partition adjacent the entrance pipe 26$^a$. Pipes 25$^a$ and 26$^a$ are preferably made larger to carry the additional flow. It will also be noted that for convenience adjacent pairs of outlet pipes 26 are connected to a single riser 27 to reduce the amount of piping. A drain and flushing outlet 34 closed by valve 35 is connected to the lowermost outlet pipe 26 communicating with the bottom compartment 15.

The rate of discharge of the heavier liquid from the various compartments is preferably controlled by varying the elevation of the overflow discharge from the respective risers 27 into box 28. This is conveniently accomplished by mounting a cage of vertical guide rods 36 around the opening at the top of each riser 27, and employing a plurality of flat close fitting rings 37 held in position by the cages. The central bore of the rings forming a continuation of the risers whose height is determined by the number and thickness of the rings employed.

A suitable discharge for the lighter liquid is connected with the upper part of the top compartment; and in the form shown rises vertically from the center thereof, being provided with suitable means for varying the overflow elevation of such liquid. This may comprise a riser 28 communicating with the outlet opening 39 in the top of the tank and opening into overflow box 40, which likewise has a split removable cover 41 held down by hinge bolts 42. Suitable rings 43 held in place by a cage of rods 44 provide means for adjusting the height of overflow in the manner already described. An outlet pipe 45 carries away the liquid overflowing into box 40.

Certain of the liquids which may be handled in the apparatus may contain substances which will settle on or adhere to the various parts of the machine; and suitable scraping mechanism for removing such substances or propelling same to a desired point may be employed. In the form shown this arrangement consists of a flat vertical plate 46 extending downwardly through openings 16 and carrying flat scrapers 47 extending immediately above and immediately below each partition or tray preferably in contact therewith. These scrapers may be constructed in any desired manner as by employing a yieldable material such as spring brass, or a yieldable edge, such as rubber. The scrapers for the tops and bottoms of the partitions respectively are preferably alternated for simplicity and strength.

The plate 46 is supported in suitable bearings, such as step bearing 48 at the bottom of the tank in which the rounded lower end of plate 46 is seated, and stirrup bearing 49 at the upper part of the tank which engages the rounded upper end of plate 46, which may carry a handle 51 above the cover 41 for rotating the cleaning mechanism when necessary.

While a wide variety of cleaning devices may be employed, it will be apparent that the scrapers as shown do not interfere with the flow of the mixed or separated liquids in the manner desired, being preferably kept in alignment with the inlet and outlet openings.

In the simplified form shown in Figs. 3, 4 and 5, the general arrangement and construction is the same, the feed being introduced through pipe 19$^a$ into feed well 24$^a$ which may consist simply of a vertical box extending downwardly along the side of the tank. The feed to each compartment is introduced through suitable openings 25$^b$, and the discharge passes through openings 26$^b$ into the outlet well 27$^a$, which also may comprise simply a vertical box running along the side of the tank with a fixed outlet pipe 29$^a$ communicating with the upper part thereof.

One serious practical problem in apparatus of this type is the provision for uniform feed to the various compartments, since lack of uniformity means lower efficiency in other compartments and a corresponding overall loss of efficiency. This may be accomplished, in addition to the overflow control already described, by employing sliding gates 60 laterally adjustable to cover any desired portion of the inlet or outlet openings 25$^b$ and 26$^b$, which may be in the form of horizontal slots, preferably varying in size, with the smaller slots communicating with the upper compartments. The adjustment may be accomplished readily by swiveling each plate on the end of threaded rods 61 threaded into the side wall of the feed well 24$^a$ or discharge channel 27$^a$. It will be apparent that the feed and discharge systems shown in the two embodiments illustrated are mutually interchangeable within the scope of the invention.

The operation of the apparatus is as follows. The feed mixture is introduced from pipe 17 by closing valve 18 and opening valve 20, and flows from box 21 downwardly through feed well 24, inlet 25 and opening 32 into each compartment except the uppermost. The box 21 permits insepection of the character of the feed and the elevation of same by removal of split cover 22; and if desired, or if only part of the flow from pipe 17 is taken, the valves may be adjusted and substantially uniform level maintained in the box.

The feed on entering each compartment flows around and across the compartment to the discharge. As the lighter liquid separates it rises against the top of the compartment and flows upwardly along the slope thereof to outlet 16; while the heavier liquid tends to flow along the bottom of the compartment. Since the longest path of flow from inlet to outlet is around the periphery of the compartment at the bottom thereof, and the heavier liquid naturally follows this path, the finer or more slowly separating particles of the lighter liquid are therefore afforded plenty of time to rise. The cross section of the flow path is furthermore calculated with relation to the size of inlet and rate of feed so that suitable detention is insured between inlet and outlet to permit all lighter liquid to be removed if possible.

The liquid arriving at outlet pipes 26 is therefore heavier liquid free from the lighter components, and is forced by hydrostatic pressure upwardly thru risers 27 overflowing into box 28. The height of rings 37 surmounting each overflow determines the hydrostatic back pressure and therefore the relative rate of discharge from each riser. Since the discharge is generally proportional to the feed to each compartment, this arrangement indirectly but accurately controls the relative feed.

The feed to compartment 13$^a$ obviously passes upwardly through opening 32, travels around the compartment in the manner already described, and discharges its heavier component downwardly through opening 33, where it is removed through the outlet pipe 26$^a$.

The lighter liquid, such as oil, flows continuously upward through the channel formed by the registering openings 16 and into the uppermost compartment 14. This compartment as already noted, receives no feed, but is provided with a suitable discharge for heavier liquid. The oil therefore tends to accumulate; and owing to the size of the compartment, is detained long enough to permit any heavier liquid to settle out and be discharged. This discharge is shown as common with the general compartment discharge system, but if this arrangement is found objectionable, it will be apparent that it need not be employed in the exact manner shown.

The lighter liquid flows from compartment 14 upwardly to riser 38 and over rings 43 into outlet box 40, and is withdrawn through pipe 45. It will be apparent that in addition to adjusting rings 37 to equalize the discharge from the various compartments, it is necessary to attain a suitable balance between the height of heavier liquid overflow and that of overflow for the lighter liquid, since the level of the latter must be adjusted to compensate for the difference in specific gravity of the liquids, together with the varying conditions in feed rate, proportion of the components, and other changing factors. Where however the conditions and composition of the feed are reasonably determinable, the provisions for adjustments may be dispensed with, thus simplifying the apparatus somewhat.

The cleaning of the trays is accomplished in an obvious manner by rotating plate 46 through manipulation of handle 51.

While the preferred form of apparatus for the separation of oil from water under conditions above set forth has been described, it will be apparent that an unusual number of modifications of the particular type of machine shown can be made within the scope of the claims. For instance, variations in the shape of tank, the location of the feed and discharge connections, and the location of the light liquid discharge passage can be combined in a great number of ways. While for convenience the liquid separated has been described as oil and water, the description should be considered as applying generally to other mixtures of light and heavier liquids; and the word "liquids" may include solid suspensions which act in a similar manner. Furthermore, the word "tank" has been employed for convenience, but should be considered as indicating generally any suitable compartment, container or enclosure.

Claims:

1. Apparatus for the continuous separation of liquids of different specific gravities comprising a plurality of superposed elongated inclined compartments each having an outlet for heavier liquid in communication with the lower part thereof, a feed inlet spaced from the outlet, the lower portion of each compartment between said inlet and outlet providing a substantially horizontal path for the flow of the heavier liquid; and a common feed passage connecting with said feed inlets, the top of each compartment sloping upwardly from said path of the heavier liquid to an outlet for lighter liquid.

2. Apparatus for the continuous separation of liquids of different specific gravities comprising a plurality of superposed elongated inclined compartments each having an outlet for heavier liquid in communication with the lower part thereof, a feed inlet spaced from the outlet, the lower portion of each compartment between said inlet and outlet providing a substantially horizontal path for the flow of the heavier liquid; and a common feed passage connecting with said feed inlets, the top of each compartment sloping upwardly from said path of the heavier liquid to an outlet for lighter liquid, the latter outlet of each compartment forming a common vertical passage for the lighter liquid.

3. Apparatus for the continuous separation of liquids of different specific gravities, comprising a tank, a plurality of superposed inclined partitions extending across the tank forming a plurality of inclined compartments, means for feeding a mixture of liquids to the lower part of each compartment, each compartment having an outlet for heavier liquid at a point substantially spaced from the feed point and a vertical passage for lighter liquid communicating with the upper portion of each compartment including a common feed passage in communication directly with a plurality of compartments.

4. Apparatus for the continuous separation of liquids of different specific gravities, comprising a plurality of superposed inclined compartments each having an outlet for heavier liquid in the lower part and an outlet for lighter liquid in the upper part thereof, means for feeding a mixture of liquids to each compartment at a point substantially spaced from the heavier liquid outlet thereof, and means for varying the relative amount of feed to the different compartments.

5. Apparatus for the continuous separation of liquids of different specific gravities, comprising an elongated inclined compartment having an outlet for lighter liquid in communication with the upper part thereof, an outlet for heavier liquid in communication with the lower part of the compartment, means for feeding a mixture of liquids into the compartment at a point substantially spaced from the heavier liquid outlet, and means for varying the proportion of lighter liquid discharge relative to the rate of discharge of the heavier liquid by varying the resistance to the discharge of the lighter liquids.

6. Apparatus for the continous separation of liquids of different specific gravities, comprising an elongated inclined compartment having an outlet for lighter liquid in communication with the upper part thereof, an outlet for heavier liquid in communication with the lower part of the compartment, means for feeding a mixture of liquids into the compartment at a point substantially spaced from the heavier liquid outlet, and means for varying the proportion of lighter liquid discharge relative to the rate of discharge of the heavier liquid by varying the elevation of overflow discharge of the lighter liquid.

7. Apparatus for the continuous separation of liquids of different specific gravities comprising an elongated inclined compartment having an outlet for lighter liquid in communication with the upper part thereof, an outlet for heavier liquid in communication with the lower part of the compartment, means for feeding a mixture of liquids into the compartment at a point substantially spaced from the heavier liquid outlet, conduits connected to the feeding means and to the heavier liquid discharge outlet means, said conduit extending upwardly to an elevation sufficient to maintain the compartment substantially full, and means for varying the elevation of the uppermost point in the discharge conduit for heavier liquid.

8. Apparatus for the continuous separation of liquids of different specific gravities comprising a plurality of superposed inclined compartments each having an outlet for lighter liquid in communication with the upper part thereof, an outlet for heavier liquid in communication with the lower part thereof, closure means at the bottom of each compartment forming a generally horizontal path for the flow of liquid, means for feeding a mixture of liquids into each compartment at a point substantially spaced from the outlet for heavier liquid, and means for varying the proportion of the feed which passes into the various compartments.

9. Apparatus for the continuous separation of liquids of different specific gravities comprising a plurality of superposed inclined compartments each having an outlet for lighter liquid in communication with the upper part thereof, an outlet for heavier liquid in communication with the lower part thereof, closure means at the bottom of each compartment forming a generally horizontal path for the flow of liquid, means for feeding a mixture of liquids into each compartment at a point substantially spaced from the outlet for heavier liquid, and means for varying the relative amount of heavier liquid which is discharged through the outlets from the various compartments.

10. Apparatus for the continuous separation of liquids of different specific gravities comprising a plurality of superposed inclined compartments each having an outlet for lighter liquid in communication with the upper part thereof, an outlet for heavier liquid in communication with the lower part thereof, closure means at the bottom of each compartment forming a generally horizontal path for the flow of liquid, and a passage connecting the lower portions of adjacent compartments for distributing feed thereto, spaced from the heavier liquid outlets.

11. Apparatus for the continuous separation of liquids of different specific gravities comprising a plurality of superposed inclined compartments each having an outlet for lighter liquid in communication with the upper part thereof, an outlet for heavier liquid in communication with the lower part thereof, closure means at the bottom of each compartment forming a generally horizontal path for the flow of liquid, means for introducing mixed liquids to each compartment, and a passage connecting the lower portions of a plurality of said compartments for the discharge of the heavier liquid at a point substantially spaced from the feed.

12. Apparatus for the continuous separation of liquids of different specific gravities comprising a plurality of superposed separation compartments, a passage for the discharge of lighter liquid from said compartments, an upper compartment for the removal of residual traces of heavier liquid and into which the passage discharges, means for withdrawing the heavier liquid from each compartment, and feeding means, said upper compartment having no direct feed connection.

13. Apparatus for the continuous separation of liquids of different specific gravities comprising a tank, a plurality of inclined partitions extending substantially across the tank and defining a plurality of superposed inclined compartments; a vertical feed well connected to the lower portion of each of said compartments except the uppermost, adjacent one extremity of each compartment; vertical overflow means connected to the lower part of each compartment adjacent the other extremity and extending upwardly to a sufficient elevation to maintain the tank substantially full of liquid; a vertical overflow passage for the lighter liquid in communication with the upper part of each compartment, and means for varying the hydrostatic head in the overflow means to adjust the proportional discharge of the lighter and heavier liquids.

14. Apparatus for the continuous separation of liquids of different specific gravities comprising an annular compartment having upper and lower walls sloping upwardly to an outlet for lighter liquid, and having an outlet for heavier liquid communicating with the lower part of the compartment; closure means at the bottom of each compartment forming a generally horizontal path for the flow of liquid, and means for introducing a mixture of liquids into the lower portion of the compartment at a point substantially spaced around the compartment from the point of heavier liquid discharge.

15. Apparatus for the continuous separation of liquids of different specific gravities comprising a plurality of superposed annular separation compartments each sloping upwardly to an outlet for lighter liquid, and having an outlet for heavier liquid in communication with the lower part thereof, the outlets for the lighter liquid from the compartments being substantially in vertical alignment, closure means at the bottom of each compartment forming a generally horizontal path for the flow of liquid, and means for introducing a mixture of liquids into each compartment at a point substantially spaced from the heavy liquid outlet.

16. Apparatus for the continuous separation of liquids of different specific gravities comprising a plurality of trays extending substantially across the tank and sloping upwardly from their outer edges, with an opening adjacent the uppermost point of each tray, constituting a plurality of superposed separating chambers; an outlet for heavier liquid in communication with the lower portion of each compartment; and means independent of said opening for feeding a mixture of liquids to each compartment at a point substantially spaced from said outlet.

17. Apparatus for the continuous separation of liquids of different specific gravities comprising a plurality of annular compartments each sloping upwardly to a substantially central outlet for lighter liquid and having an outlet for heavier liquid in communication with the lower part thereof; means for feeding a mixture of liquids to the lower part of each compartment at a point substantially spaced from the outlet for heavier liquid; the outlet for each compartment forming a vertical central passage for the lighter liquid.

18. Apparatus for the continuous separation of liquids of different specific gravities comprising a separation tank, a series of transverse partitions vertically arranged and having their outer edges in substantial contact with the tank walls and extending upwardly and inwardly to an outlet opening for the lighter liquid, the spaces between adjacent partitions having an outlet for heavier liquid in communication with the lower part thereof; and means for feeding a mixture of liquids to spaces between the partitions at points substantially spaced from the outlet for heavier liquid in each respective space.

19. Apparatus for the continuous separation of liquids of different specific gravities comprising a separation tank, a series of transverse partitions vertically arranged and extending substantially to the side walls of the tank, and sloping upwardly to a discharge opening for lighter liquid, vertically aligned outlets for heavier liquid in communication with the lower portions of the spaces between said partitions, closure means at the bottom of each compartment forming a generally horizontal path for the flow of liquid, and vertically aligned feed inlets substantially opposite to said last mentioned outlets.

20. Apparatus for the continuous separation of liquids of different specific gravities comprising a separation tank, a plurality of transverse compartments therein having inlet and outlet openings and extending from said openings across the entire remaining area of the tank; vertical feed means extending downwardly along one side of the tank and communicating with each compartment; and vertical discharge means for the heavier liquid extending down the opposite side of the tank and communicating with each compartment.

HARRISON S. COE.